(12) United States Patent
Rand et al.

(10) Patent No.: US 8,381,435 B2
(45) Date of Patent: Feb. 26, 2013

(54) ADJUSTABLE PLANT POT SUPPORTS

(76) Inventors: Austin Rand, Vancouver (CA); Enn Erisalu, White Rock (CA); Ron Aloni, legal representative, Vancouver (CA)

( * ) Notice: Subject to any disclaimer, the term of this patent is extended or adjusted under 35 U.S.C. 154(b) by 414 days.

(21) Appl. No.: 11/572,292

(22) PCT Filed: Jul. 22, 2005

(86) PCT No.: PCT/CA2005/001159
§ 371 (c)(1),
(2), (4) Date: Jan. 20, 2009

(87) PCT Pub. No.: WO2006/007731
PCT Pub. Date: Jan. 26, 2006

(65) Prior Publication Data
US 2009/0173000 A1 Jul. 9, 2009

(30) Foreign Application Priority Data

Jul. 22, 2004 (CA) .................................... 24758660

(51) Int. Cl.
*A47G 7/02* (2006.01)
(52) U.S. Cl. ...................................... 47/39; 248/346.05
(58) Field of Classification Search ................ 47/39, 71; 248/346.11, 346.06, 346.5; 206/501, 514, 206/515, 518
See application file for complete search history.

(56) References Cited

U.S. PATENT DOCUMENTS

| | | | | | |
|---|---|---|---|---|---|
| 2,989,205 | A | * | 6/1961 | Yaws | 248/346.11 |
| 3,104,044 | A | * | 9/1963 | Reifers | 229/407 |
| 3,352,525 | A | * | 11/1967 | Lowes | 248/346.5 |
| 3,647,112 | A | * | 3/1972 | Limbert, Jr. | 206/518 |
| 4,597,550 | A | * | 7/1986 | Rice, Sr. | 248/146 |
| 4,833,823 | A | | 5/1989 | Edwards, III | |
| D341,779 | S | * | 11/1993 | Lewis | D9/435 |
| 5,309,670 | A | | 5/1994 | Bates | |
| 6,029,396 | A | | 2/2000 | Gillingham | |
| 6,419,195 | B1 | * | 7/2002 | Van Reed et al. | 248/154 |
| 6,905,017 | B1 | * | 6/2005 | Sarnoff et al. | 206/223 |
| 7,520,483 | B2 | | 4/2009 | Rand | |
| D609,977 | S | * | 2/2010 | Gjonaj | D7/624.1 |
| 2005/0067315 | A1 | * | 3/2005 | Masello | 206/515 |

FOREIGN PATENT DOCUMENTS

CA 2415311 4/2003

* cited by examiner

*Primary Examiner* — Kristen C Hayes
(74) *Attorney, Agent, or Firm* — C. Larry Kyle; Nexus Law Group LLP

(57) ABSTRACT

An adjustable plant pot support for supporting a plant pot on an underlying surface. The support has a substantially rigid body having top and bottom surfaces and an outer perimeter surface. The top surface is adapted to support a portion of the plant pot and the bottom surface is adapted to be seated on the underlying surface. The body has male and female elements that are adapted to be interconnected with the corresponding male and female elements of an additional plant pot support. The supports are vertically stackable and have a retaining wall extending vertically from the top surface to provide a guide against which to place the bottom of the plant pot.

9 Claims, 5 Drawing Sheets

ADJUSTABLE PLANT POT SUPPORTS

FIELD OF THE INVENTION

The present invention relates to adjustable supports for supporting a plant pot on an underlying surface.

BACKGROUND OF THE INVENTION

Plant pots seated directly on an underlying surface such as a deck can leave unsightly marks as a result of trapped dirt and moisture. In order to prevent this, the plant pot must be raised above the underlying surface so as to allow proper air circulation and evaporation of any liquids and to prevent the accumulation of dirt.

At its most basic, the raising of the plant pot requires the addition of a plurality of feet. The feet can take the form of rounded pads that can be fitted between the base of the pot and the underlying surface, thereby raising the pot off the surface by the height of the feet. While the use of rounded pads accomplishes the goal of raising the pot off the surface, the pads do suffer from a number of drawbacks. For example, the positioning of the pads below the bottom surface of the pot can be difficult, and use of the pads results in the positioning of the pot at a fixed, unalterable distance from the surface.

A number of inventions have been designed to provide ways to elevate a plant pot. U.S. Pat. No. 4,833,828 teaches a potted plant support platform. The plant pot is seated on the platform. The platform is raised above the surface upon which it is placed by a plurality of a really spaced apart projections extending from the bottom of the platform. U.S. Pat. No. 5,209,013 teaches a rigid planar support with a plurality of support legs in the form of semi-circular cavities vertically and arcuate shaped horizontally. U.S. Pat. No. 5,321,909 teaches a plant pot support comprising a platform member having a plurality of wedge shaped support members projecting from the bottom of the platform. U.S. Pat. No. 6,029,396 teaches a multi-armed plant pot support, with sections of each arm being readily manually broken off to configure the pot support to the size preferred by the user.

Like the support pads discussed above, the inventions taught in the above-noted patents place the pot at a fixed unalterable distance from the surface upon which it is placed and cannot compensate for any slope in the underlying surface. Such sloped surfaces are frequently found in outdoor areas where people want to put pots, such as home entrances, driveways, balconies, porches, patios and decks, all of which are generally sloped for drainage.

A further drawback of the platform-style supports is that they are typically suited only to a specific size and shape of pot.

Accordingly it is an object of an embodiment of the present invention to overcome the deficiencies noted above.

Other objects of the invention will be apparent from the description that follows.

SUMMARY OF THE INVENTION

The present invention comprises a pot support that is designed to be securely vertically adjustable, so that one or more can be used at a given support point, thus providing the user with the ability to support a plant pot at various preferred distances from the underlying surface. The interconnecting pot support can also be used to provide a level on an uneven or sloped area by use of different numbers of interconnected pot supports at different support points, as needed to make the plant pot sit level. For example, levelling could be achieved by placing one pot support at a support point higher on the slope and two or more interconnecting pot supports at different support points lower on the slope.

According to an embodiment of the invention there is provided a plant pot support apparatus for supporting a plant pot on an underlying surface. The pot support comprises a substantially rigid body having top and bottom surfaces and an outer perimeter surface. The top surface is adapted to support a portion of the plant pot, while the bottom surface is adapted to be seated on the underlying surface. The rigid body has male and female elements adapted to be interconnected with the corresponding male and female elements of an additional plant pot support.

In another aspect, the invention further comprises a retaining wall extending vertically from the rigid body substantially perpendicular to the top surface.

In yet another aspect, the female element of an embodiment of the invention comprises a cavity and the male element comprises a projection sized to fit within the cavity. The cavity has a base surface which may be angled or parallel relative to the bottom surface.

In another aspect, the invention further comprises a plurality of channels formed in the bottom surface.

In yet another aspect, an embodiment of the invention comprises an opening formed in the body passing from the top surface to the bottom surface.

According to an alternative embodiment of the invention there is provided an assembly for supporting a plant pot on a surface. The assembly comprises at least two plant pot support members, each member having an upper surface and a lower surface, wherein the upper surface of a first of the plant pot support members is adapted to be matingly engaged with the lower surface of a second of the plant pot support members.

According to a further alternative embodiment of the invention there is provided a kit for supporting a plant pot on an underlying surface. The kit comprises a plurality of plant pot supports. Each plant pot supports comprises a rigid body having top and bottom surfaces and an outer perimeter surface. The top surface is adapted to support a portion of the plant pot and the bottom surface is adapted to be seated on the underlying surface. Each of the plant pot supports is adapted to be vertically interconnected with another of the plant pot supports.

In another aspect, the invention comprises a method of using the plant pot supports described above to level a plant pot above a sloped surface. The method comprises stacking a first of the plant supports on a second of the plant supports to form a first stacking unit. A third one of the plant supports is stacked on a fourth of the plant supports to form a second stacking unit. A fifth one of the plant supports is stacked on the sloped surface along with the first and second stacking units, with the fifth plant support being positioned at a higher elevation than the stacking units. The plant pot is then placed on the fifth plant support and the first and second stacking units. The positioning of the stacking units and the fifth plant support are altered as necessary to level the plant pot on the sloped surface.

Further plant supports can be stacked as necessary to level the plant pot on the sloped surface.

The foregoing was intended as a broad summary only and of only some of the aspects of the invention. It was not intended to define the limits or requirements of the invention. Other aspects of the invention will be appreciated by reference to the detailed description of the preferred embodiment and to the claims.

BRIEF DESCRIPTION OF THE DRAWINGS

These and other features of the invention will become more apparent from the following description in which reference is made to the appended drawings and wherein.

DETAILED DESCRIPTION OF THE PREFERRED EMBODIMENTS

Figure 1:
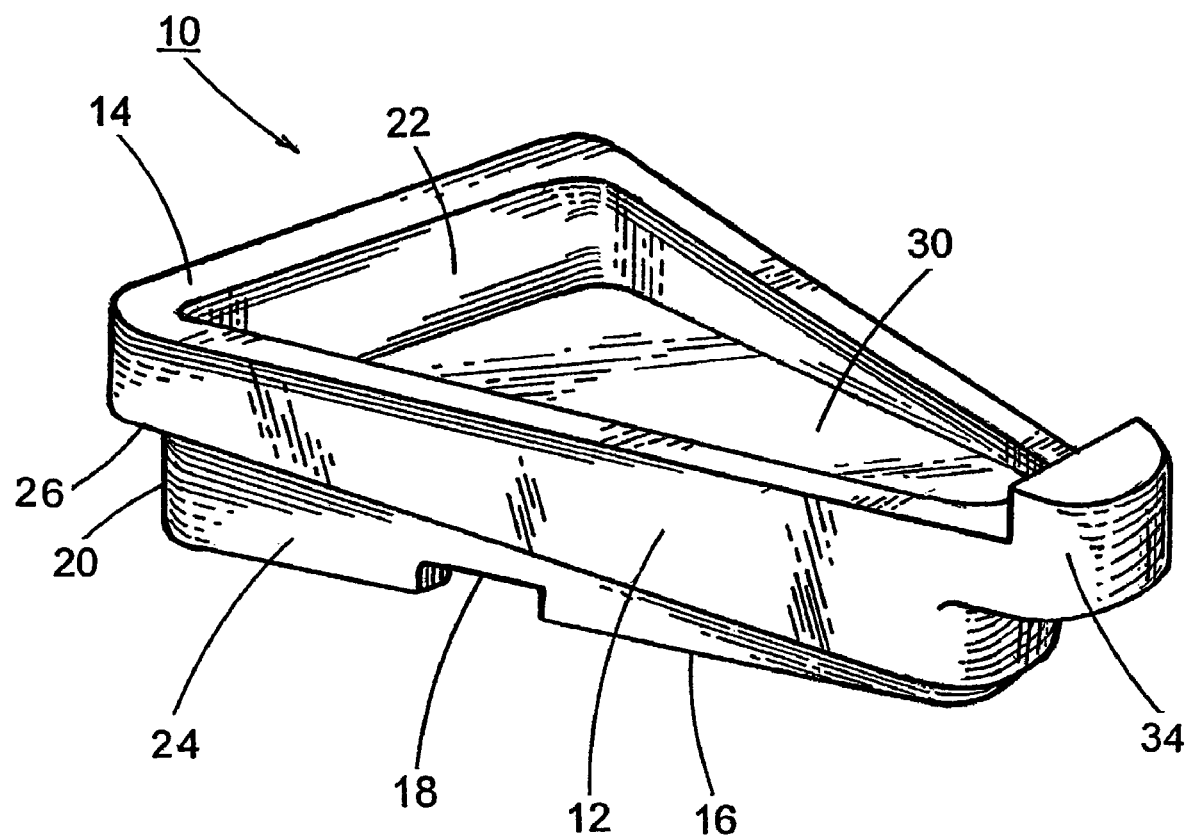
FIG. 1 is a perspective view of a preferred embodiment of an adjustable pot support.
Figure 2:
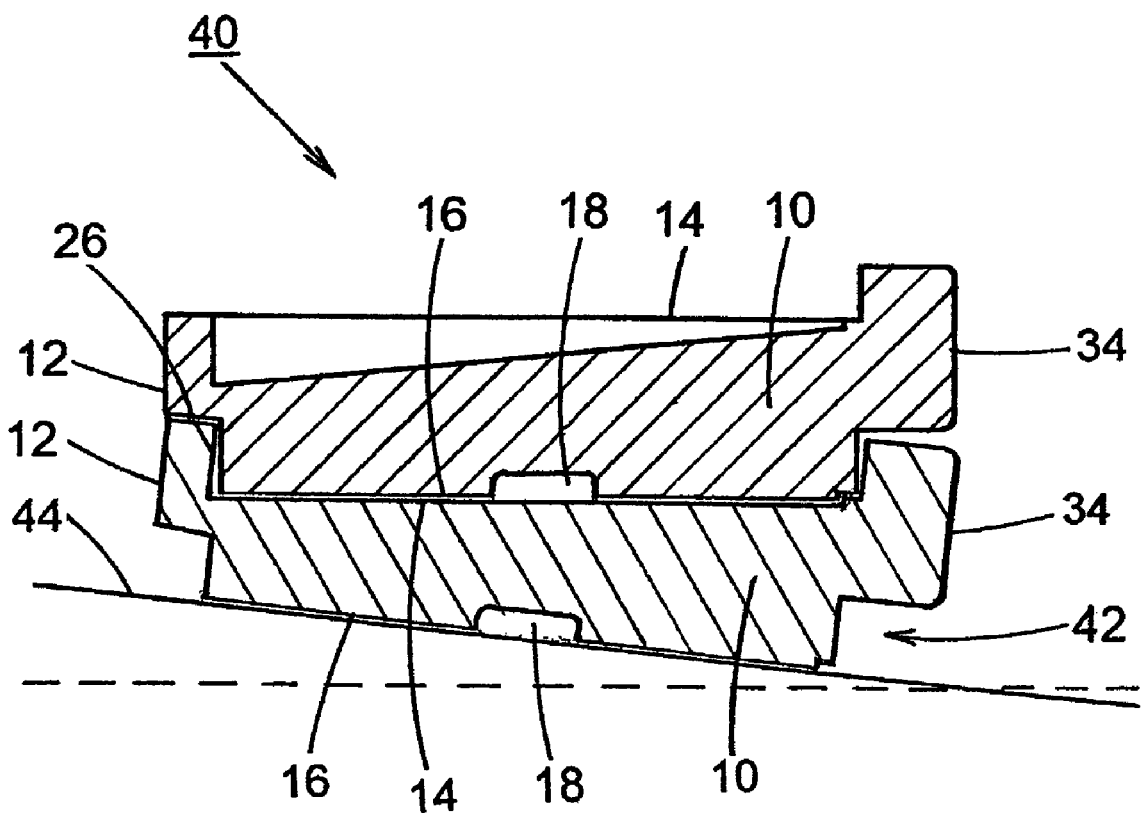
FIG. 2 is a cross-sectional view of two of the pot supports of FIG. 1, showing the supports in a vertically stacked position on a sloped surface.

The preferred embodiment of an adjustable plant pot support apparatus according to the invention is shown in FIG. 1. The pot supports 10 may be stacked one atop another as illustrated in FIG. 2. The design of the support and its use will be discussed in greater detail below.

As shown in FIG. 1, adjustable pot support 10 comprises a substantially rigid body having an upper surface 14, a lower surface 16, a front end, a rear end, and an outer perimeter surface 12 generally defining a triangle when viewed from above. The actual shape defined by surface 12 need not be triangular, this shape has simply been adopted for the purposes of describing the invention. The pot support may in fact have a variety of shapes and configuration and need simply be of sufficient rigidity, length, height and breadth to provide a stable support for the plant pot that will be place on it.

Preferably upper surface 14 and lower surface 16 lie substantially in respective planes. In order to allow any water coming into contact with the bottom of the support 10 to drain, a plurality of channels 18 may be positioned about the lower surface. This prevents pooling of water below and around the support 10.

Pot support 10 includes a retaining wall 34 projecting outward from perimeter surface 12 and extending vertically above the level of upper surface 14. Preferably the retaining wall 34 extends upwards substantially perpendicularly to upper surface 14. Retaining wall 34 assists the user when inserting the pot support underneath a pot, so as not to push the pot support in too far. Once in place, retaining wall 34 also provides a barrier against unwanted lateral movement of the pot. By projecting out from the perimeter wall a space 42 is formed beneath the retaining wall extending to the lower surface 16. Preferably the distance from bottom surface 16 to the base of the retaining wall 34 is greater than the distance that retaining wall 34 extends above upper surface 14. In this way, the recess allows for the interconnection of pot supports: the retaining wall 34 of one support fits in the space 42 of a second support when two supports are interconnected as discussed below.

The pot support 10 has a male element 20 and a female element 24, which allow for the interconnection of two pot supports. Male element 20 has a perimeter side surface 22 that is recessed from the outer perimeter surface 12. The amount of the recess of perimeter side surface 22 is defined by an undercut 26. Preferably undercut 26 lies substantially in a plane, which plane diverges from the plane of upper surface 14 in the direction of retaining wall 34. However, it is also contemplated that the undercut 26 could also lie in a plane that is parallel to the plane of the upper surface.

The female element 24 is preferably in the form of a cavity with a base surface 30. The cavity is dimensioned to correspond to the size and dimensions of male portion 22. Preferably base surface 30 is angled relative to upper surface 14 in an equal and opposite way as undercut 26 is angled relative to upper surface 14.

FIG. 2 illustrates the interconnecting of two supports 10 so as to form a stacking unit 40. When two supports 10 are joined, the male element 20 of one support is fitted into the female element 24 of the other support. In the embodiment shown, the male element 20 of the upper pot support fits into the female element 24 of the lower pot support, with the lower surface 16 and undercut 26 of the upper pot foot resting on the base surface 30 and upper surface 14 respectively of the lower pot foot 10. Since male element 20 is deeper towards the base of the triangular pot foot 10, the stacking unit 40 shows a wedge-shaped profile that is higher at the front (for the purposes of this application, the retaining wall 34 is considered the front of the pot support) and lower at the back. By forming this wedge shape, stacking unit 40 compensates for the slope 44 so that a pot placed on upper bearing surface 14 of the upper pot support will be seated horizontal with load distributed along the length of upper bearing surface 14. Utilizing varying heights of pot supports will allow the user to optimize leveling by providing a choice of various interconnecting combinations.

It is also contemplated that the male and female elements may be adapted such that when two supports 10 are stacked upon one another the top surfaces of each remain parallel to one another. Each of these variants allows the stacking of multiple pot supports in order to provide variation in the height at which a pot will be supported above the underlying surface. The parallel variant, however, does not provide as much adjustment for slope.

Figure 3:
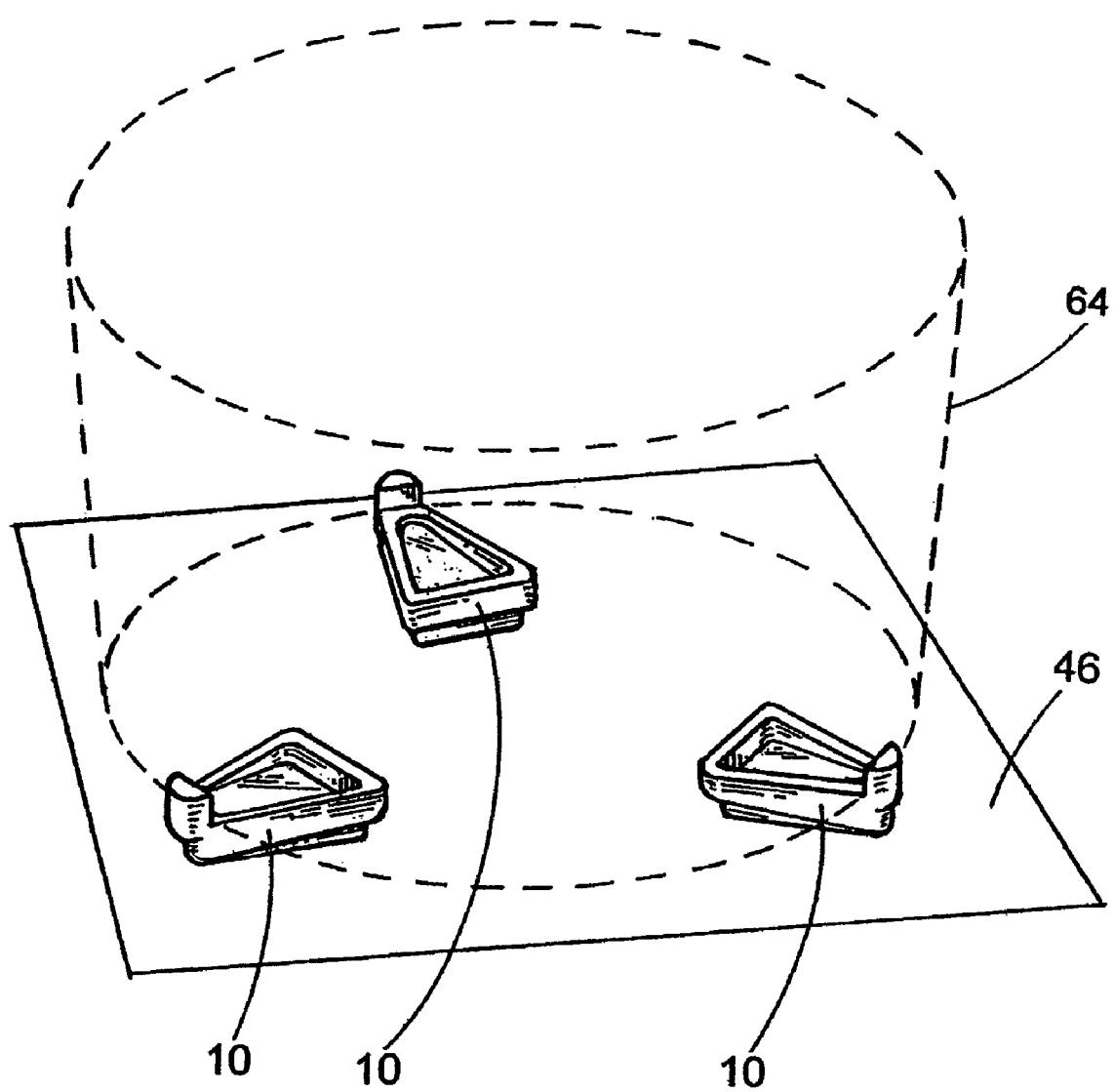
FIG. 3 is a perspective view showing three of the pot supports of FIG. 1 positioned on a surface so as to support a plant pot shown in stippled lines.

Referring now to FIG. 3, use of a plurality of the pot supports 10 to support a pot 64 is shown. Three identical pot supports 10 are placed at three points on horizontal surface 46 in a single-height use that provides a level seat for pot 64 on a horizontal surface.

Figure 4:
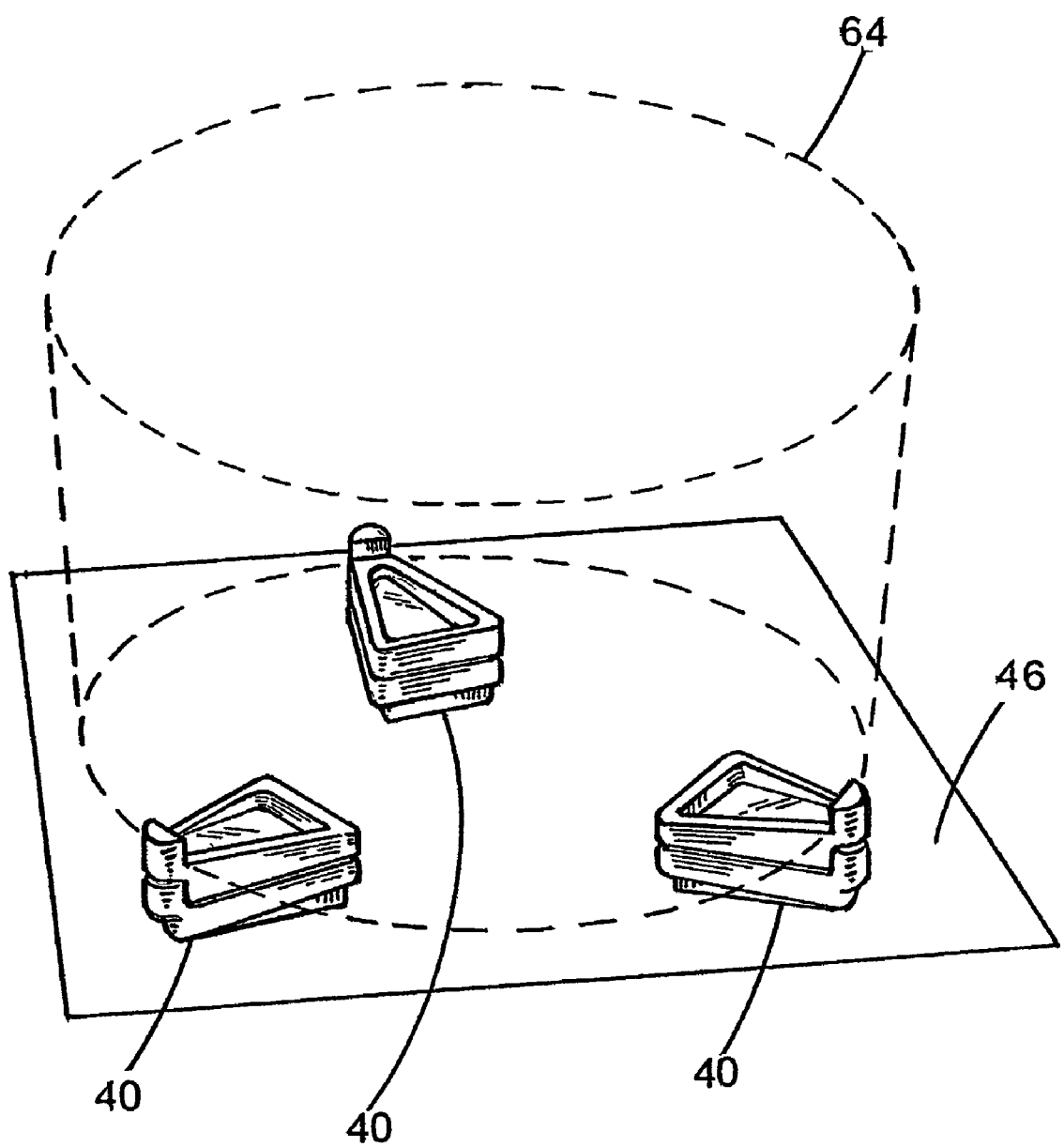
FIG. 4 is a perspective view showing a plurality of the pot supports of FIG. 1 positioned on a surface so as to support a plant pot shown in stippled lines.

Referring now to FIG. 4, use of a plurality of stacked pot feet 10 to support a pot 64 on a horizontal surface 46 is shown. Three stacking units 40 comprising two pot feet stacked in each unit are spaced on surface 46 and the pot 64 placed atop them.

Figure 5:
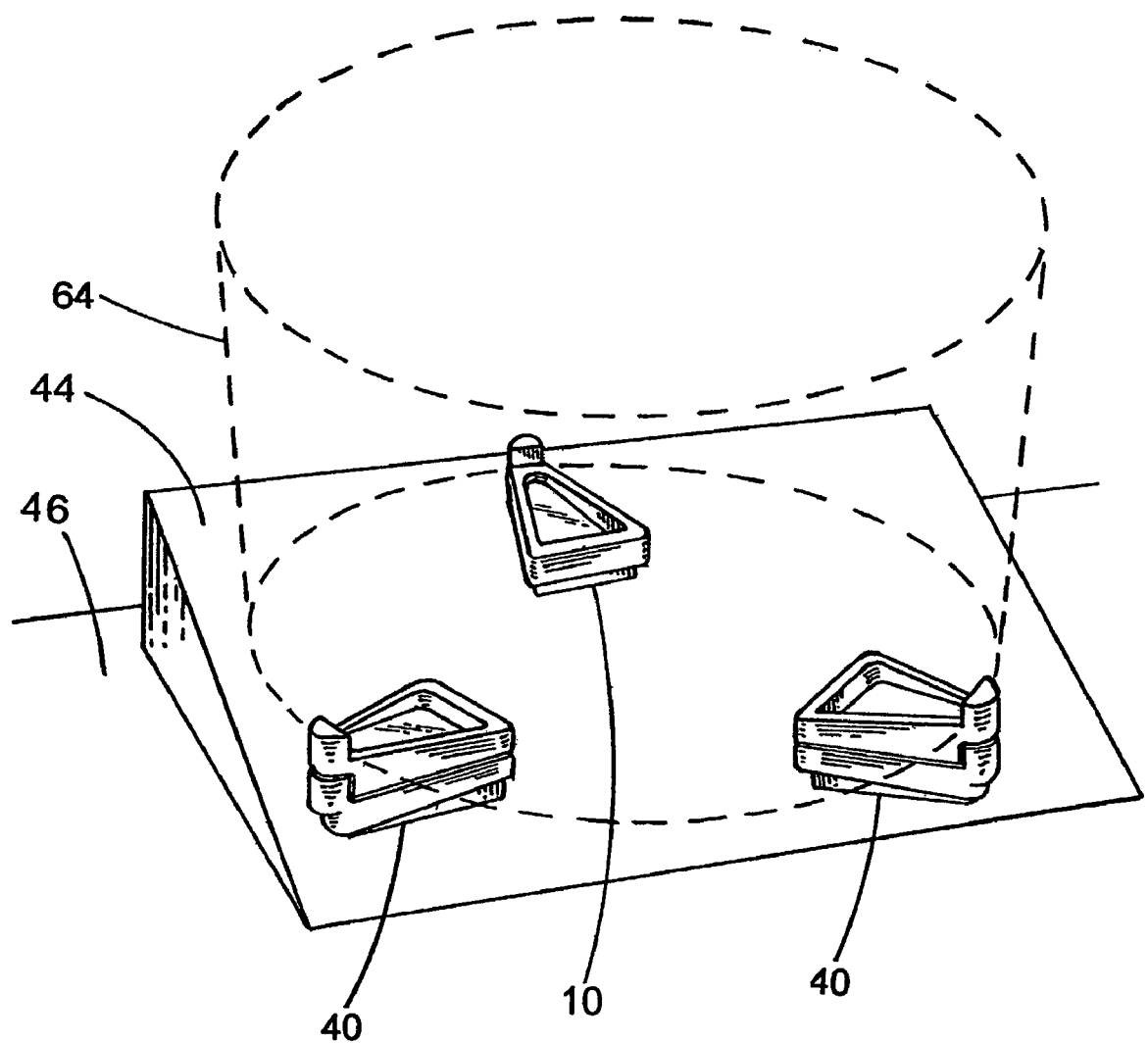
FIG. 5 is a perspective view showing three sets of the pot supports of FIG. 1 positioned on a sloped surface so as to support a plant pot shown in stippled lines.

Referring now to FIG. 5, use of a plurality of pot feet to support and level a pot 64 on a sloped surface 44 is shown. A single pot foot 10 is placed towards the high end of the slope while at points lower on the slope, two double-height stacking units 40 of interconnected pot supports are used. The actual positioning of the single pot support and the stacking units is varied until the overall positioning of the pot is horizontally level.

Preferably the pot foot 10 will be made of a high-density plastic, or other formable material, and is suited to mass production.

As discussed above, it can be seen that the shape of the adjustable pot support can be changed from triangular to circular, square, rectangular, cylindrical, or many other shapes without essentially changing the way in which it functions. It could also have an opening travelling from the top to the bottom surface, so as to reduce the amount of material required.

It is also apparent that various sizes or heights of pot support, and of male and female elements could be used as long as the interconnecting function is maintained. The availability of the pot support in different heights, as measured from the lower support surface 16 to the upper bearing surface 14, will allow the user to vertically adjust the support height to a wide range of heights. It can also be seen that the planes formed by the upper bearing surface 14 and lower support surface 16 can be in an intersecting instead of a parallel relationship and that the amount of recessing may be increased or decreased as long as the height-adjustable function is maintained. Similarly, the undercut 26 and lower surface 16 may be shaped in various ways that depart from a straight line, so long as the base surface 30 within the female element 24 and the upper surface 14 are modified in a complementary way so as to maintain connectability of the supports.

It will be appreciated that various modifications might be made to the invention without departing from the essence of it, which is a manner of providing variable height on both level and sloped areas, and adjustment for slope when desired by the user, while permitting air flow and moisture reduction under potted plants.

It will be appreciated by those skilled in the art that the preferred and alternative embodiments have been described in some detail but that certain modifications may be practiced without departing from the principles of the invention.

What is claimed is:

1. A plant pot support apparatus for supporting a plant pot on an underlying surface comprising:
    a substantially rigid body having an upper surface, a lower surface, a front end, a rear end, and an outer perimeter surface, said upper surface being adapted to support a portion of said plant pot and said lower surface being adapted to be seated on said underlying surface;
    said rigid body having a female element in the form of a cavity defined in said upper surface, and a male element defined by said lower surface, said female element sized to correspond to said male element, said male and female elements being interconnectable with the corresponding male and female elements of an additional plant pot support; and
    a retaining wall extending vertically above and substantially perpendicular to, said upper surface at only said front end of said rigid body.

2. The apparatus of claim 1 further comprising a space below said retaining wall, said space adapted to accommodate the retaining wall of a corresponding plant pot support when connected.

3. The apparatus of claim 1 wherein said male element comprises a projection sized to fit within said cavity.

4. The apparatus of claim 3 wherein said cavity has a base surface, said base surface being angled relative to said lower surface.

5. The apparatus of claim 3 wherein said cavity has a base surface, said base surface being substantially parallel to said lower surface.

6. The apparatus of claim 1 further comprising a plurality of channels formed in said lower surface.

7. The apparatus of claim 1 further comprising an opening formed in said body passing from said upper surface to said lower surface.

8. A plant pot support apparatus comprising:
    a substantially rigid body having upper and lower surfaces and an outer perimeter surface;
    said rigid body having male and female elements interconnectable with the corresponding male and female elements of an additional plant pot support, said male element being defined by said lower surface and said female element being defined in said upper surface;
    said female element comprising a cavity and said male element comprising a projection sized to fit within said cavity, said cavity terminating in a base surface, said base surface being angled relative to said lower surface.

9. A kit for supporting a plant pot on an underlying surface comprising:
    a plurality of plant pot supports individually distributable at distinct individual positions around the underside of a pot to support the pot above an underlying surface, said plant pot supports each comprising a body having upper and lower surfaces and an outer perimeter surface having at only one end a vertical projection extending therefrom, said upper surface being adapted to support a portion of said plant pot and said lower surface being adapted to be seated on said underlying surface, characterized in that each body is substantially rigid, each of said plant pot supports is adapted to be vertically placed upon another of said plant pot supports and is adapted to also be retained against horizontal movement relative thereto.

* * * * *